(12) United States Patent
Braun

(10) Patent No.: US 6,446,101 B1
(45) Date of Patent: Sep. 3, 2002

(54) APPARATUS FOR FAST DETERMINATION OF A PRESCRIBABLE NUMBER OF HIGHEST VALUE SIGNALS

(75) Inventor: Christoph Braun, Dueren (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/388,820

(22) Filed: Sep. 1, 1999

(30) Foreign Application Priority Data

Sep. 1, 1998 (DE) ......................................... 198 39 806

(51) Int. Cl.$^7$ ................................................ G06F 7/00
(52) U.S. Cl. ..................................... 708/207; 340/146.2
(58) Field of Search .............................. 708/200, 203, 708/207, 304, 671; 340/146.2

(56) References Cited

U.S. PATENT DOCUMENTS

| | | | |
|---|---|---|---|
| 4,539,549 A | * | 9/1985 | Hong et al. .................. 708/207 |
| 4,998,219 A | * | 3/1991 | Frauenglass ................. 708/207 |
| 5,129,042 A | | 7/1992 | Jeong |
| 5,421,010 A | | 5/1995 | Artieri |
| 5,796,918 A | | 8/1998 | Menke |

FOREIGN PATENT DOCUMENTS

DE          42 10 109          10/1992

OTHER PUBLICATIONS

L. Borucki, *Digitaltechnik*, Lehrbuch, ISBN 3–519–36415–8, ch. 10, pp. 198–199 (1996).

* cited by examiner

*Primary Examiner*—Chuong Dinh Ngo
(74) *Attorney, Agent, or Firm*—Morrison & Foerster LLP

(57) ABSTRACT

An apparatus for a fast determination of a prescribable number of highest value input signals from a number of input signals each comprising an input word having a number of recoders, each one of the recoders having an input for receiving one of the input signals. The recoders recode the input words into expanded input words having significant bits dependent on a value of the input words and have an output for outputting the expanded input words. A sorting logic has a first input for receiving a control signal identifying the prescribable number and a second input for receiving the expanded input words. The sorting logic forms and outputs a prescribable number of output words of highest value input signals from the expanded input words. The advantage lies in the high processing speed, particularly given large numbers of inputs.

3 Claims, 4 Drawing Sheets

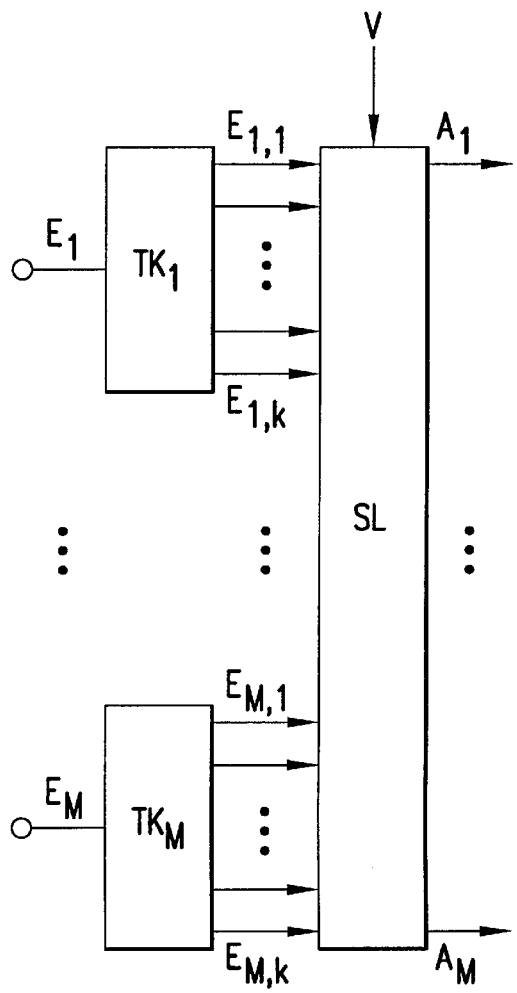

APPARATUS FOR FAST DETERMINATION OF A PRESCRIBABLE NUMBER OF HIGHEST VALUE SIGNALS

BACKGROUND OF THE INVENTION

The present invention is directed to an apparatus wherein input signals are compared or sorted with the assistance of a number of comparator circuits.

A possibility for a place-by-place comparison of two input words is known from the textbook by L. Borucki, *Digitaltechnik*, 1996, ISBN 3-519-36415-8, Chapter 10, pages 198 and 199.

The rank of more than two input signals is usually determined with a cascade-like structure of comparators, whereby each comparator makes the decision for two input quantities and respectively hands the highest input value over to the next comparator stage until the last comparator stage ultimately determines the highest input signal. When, over and above this, even more next-higher values are required, then the highest values that have already been determined can be correspondingly excluded for a further search. Given such a simple sorting means, the processing time is proportional to the number M of input signals, which is especially disadvantageous particularly given high values of M.

SUMMARY OF THE INVENTION

An object of the present invention is to provide an apparatus that, given comparable circuit outlay, allows a higher processing speed, particularly given large numbers of inputs.

This object is inventively achieved in an embodiment of an apparatus for a fast determination of a prescribable number of highest value input signals from a number of input signals each comprising an input word having a number of recoders, each one of the recoders having an input for receiving one of the input signals. The recoders recode the input words into expanded input words having significant bits dependent on a value of the input words and have an output for outputting the expanded input words. A sorting logic has a first input for receiving a control signal identifying the prescribable number and a second input for receiving the expanded input words. The sorting logic forms and outputs a prescribable number of output words of highest value input signals from the expanded input words.

In an embodiment, the sorting logic further comprises an adder module for concurrently receiving bits of the expanded input words, being ordered according to their place value, from the recoders, and outputting sum signals at an output. A comparator module connected to the output of the adder module compares the sum signals to the prescribable number and has an output. A switch module is driven by the comparator output connected to a first input of the switch module. The switch module has a second input for concurrently receiving the bits of the expanded input words, being ordered according to their place value, and an output for passing through the bits of the expanded input words selectively determined by the comparator output. An encoder module has an input connected to the output of the switch module and forms and outputs the prescribable number of output words of highest value input signals from the expanded input words being passed through from the switch module.

In an embodiment, the number of input signals further comprises M input signals. The expanded input words further comprise a word width k, wherein the adder module further comprises M*k−1 adder modules, an $i^{th}$ adder module of the M*k−1 adder modules further compring i−1 inputs, with i being an integer defined 1<i<M*k−1. A most significant bit of a first expanded input word is directly inputted to the comparator module. And, the bits of the expanded input words, being ordered according to their place value, are sequentially received at the $i^{th}$ adders.

These and other features of the invention(s) will become clearer with reference to the following detailed description of the presently preferred embodiments and accompanied drawings.

DESCRIPTION OF THE DRAWINGS

FIG. 1 is a block circuit diagram of an apparatus constructed in accordance with the present invention.

FIG. 2 is a logic table for explaining the encoder of FIG. 1.

DETAILED DESCRIPTION OF THE PRESENTLY PREFERRED EMBODIMENTS

The present invention is based on the idea of predetermining the rank of the input signals and their priorities for a sorting logic based on the sequence of the input signals. To that end, the input signals, which are usually binarily encoded, must first be converted into what is referred to as a "dotted thermometer code". The advantage of the invention is comprised therein that, due to a cascade-like structure of ordinary adders, there is only a logarithmic dependency between the number of input signals and the overall delay or processing time.

FIG. 1 is a block circuit diagram of a preferred embodiment of an inventive apparatus with a sorting logic SL and M recoders $TK_1 \ldots TK_M$, whereby it thereby becomes clear that expanded input words $E_{1,1} \ldots E_{1,k} \ldots E_{M,1} \ldots E_{M,k}$ are converted from M binarily encoded input signals or input words $E_1 \ldots E_M$, and that only then are these expanded input words $E_{1,1} \ldots E_{1,k} \ldots E_{M,1} \ldots E_{M,k}$ processed by the sorting logic SL to form an output word $A_1 \ldots A_M$ for determining n highest input signals. The desired number n is set in the sorting logic SL with a control signal V, whereby n can be between 1 and M.

FIG. 2 shows a logic table for the recoders $TK_1 \ldots TK_M$ in the form of a dotted thermometer code, whereby an input signal 00 that is two bits wide here supplies an expanded input word 1000 that is four bits wide, a two-bit wide input word 10 supplies an expanded input word 0100, an input word 01 supplies an expanded input word 0010 and an input word 11, finally, supplies an expanded input word 0001. The input word is recoded such that the position of a significant bit, the "1" bit here, in the expanded input word is dependent on the value of the input word.

Figure 3:
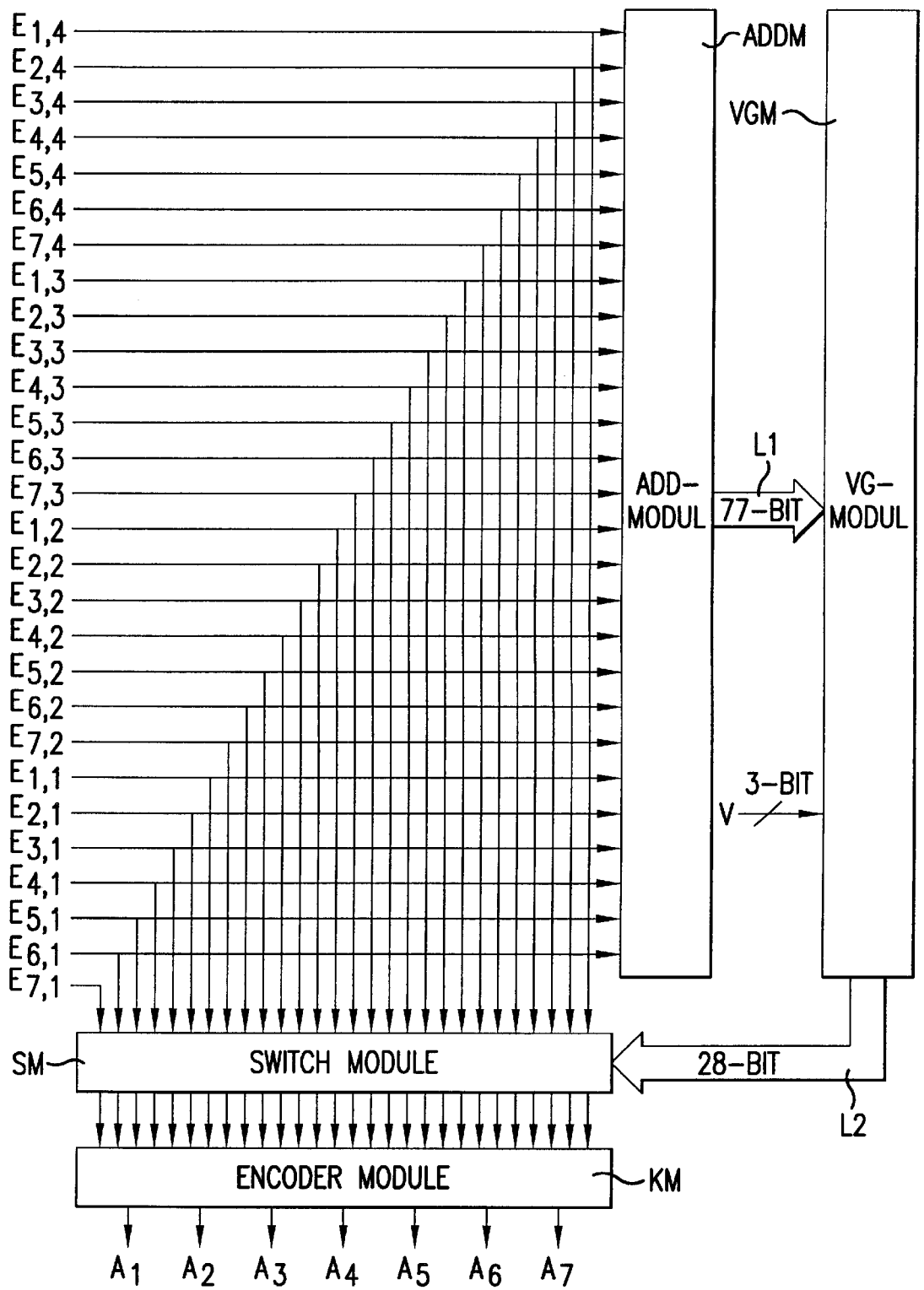
FIG. 3 is a detailed block circuit diagram of the sorting logic of the preferred embodiment of the invention.

FIG. 3 is a block circuit diagram of a sorting logic of the present invention with an adder module ADDM, a comparator module VGM, a switch module SM and an encoder module KM following the switch module SM. It thereby becomes clear that the bit signals of all input words $E_{1,1} \ldots E_{7,4}$ are ordered according to their place value and according to a fixed sequence within an identical place value, and are supplied both to the adder module ADDM as well as to the switch module SM. The adder module ADDM is connected to the comparator module VGM via lines L1, with 77 parallel bit lines L1 here. Over and above this, the comparator module VGM receives the control signal V (which is 3 bits wide here) for the number n, and is connected to the switch module SM via further lines L2, with 28 parallel bit lines L2 here. Dependent on the signals on the lines L2, bit signals of the expanded input words are through-connected to the encoder module KM and are encoded into the output word $A_1 \ldots A_7$ therein.

Figure 4:
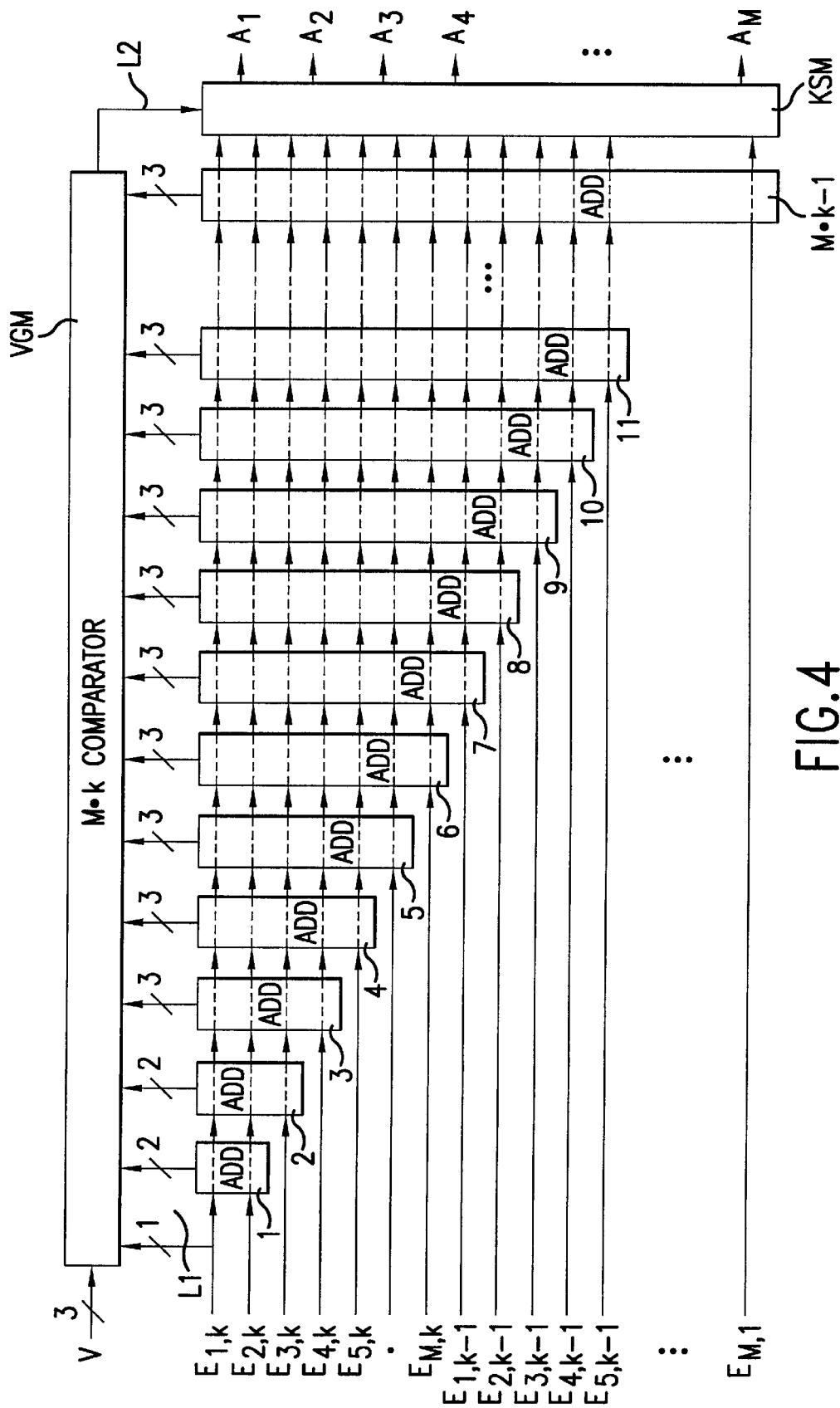
FIG. 4 is a detailed block circuit diagram of the sorting logic of the invention with an adder module shown in detail.

FIG. 4 is a more detailed block circuit diagram of the sorting logic of the present invention. The adder module ADDM in FIG. 3 is composed of M*k−1 adders 1 . . . M*k−1, with k representing the word width of the expanded input word. The most significant bit $E_{1,k}$ of the input word $E_1$ is thereby directly supplied to the comparator module VGM and all first inputs of the adders ADD 1 . . . M*k−1. The most significant bit $E_{2,k}$ of the input signal $E_2$ is supplied to all second inputs of the adders ADD 1 . . . M*k−1. In a corresponding way, the most significant bits are supplied to the i+1$^{st}$ input of the i$^{th}$ adder ADD, whereby the next-significant bits, etc., follow the bit signal $E_{M,k}$ in the same sequence of the input signals. It thereby becomes clear that the i$^{th}$ comprises i+1 inputs and, thus, the last adder ADD M*k−1 sums up exactly M*k input bits $E_{1,k} \ldots E_{M,1}$. The comparison module VGM comprises M*k comparators that compare the bit signal $E_{1,k}$ or the output signals of the M*k−1 adders, which are supplied to the comparison module VGM via the lines L1, to the three-bit wide control or comparison signal V, which represents the number n, in parallel. Via the lines L2, the comparison results are transmitted to a processing module KSM composed of the switch module SM and the encoder module KM and are further-processed there with the expanded input words to produce the output word $A_1 \ldots A_M$. Here, the adders ADD 1 and 2 supply an output signal for the comparator module VGM that is only two bits wide, and the other adders ADD 3 . . . M*k−1 supply an output signal that is three bits wide.

Each of the M*k adders ADD sums up the input signals for a corresponding thermometer code, so that all possible thermometer codes are acquired. The output signals of the adders ADD 1 . . . M*k−1 are compared to the control signal V that prescribes the number of highest values. When the output signal of a respective adder coincides with the signal V, then the input signals thereof proceeds to the encoder module KM. The encoder module KM allocates an output signal $A_i$ likewise having the level 1 to each bit signal of the expanded input word with the level 1, and all other outputs receive the value 0.

Figure 5:
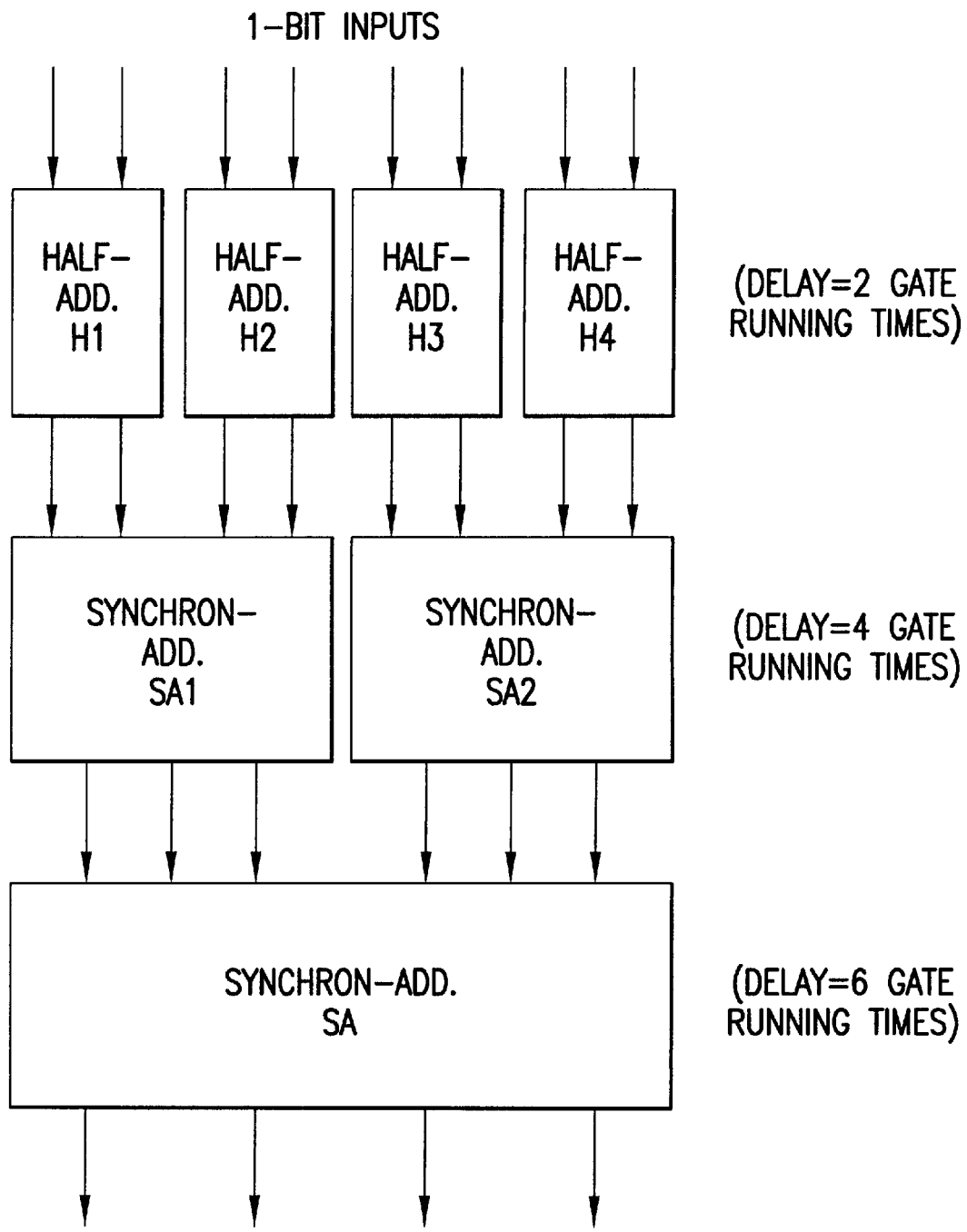
FIG. 5 is a block diagram of adder circuits for explaining the non-linear dependency of the delay time of the number of inputs.

For illustrating the occurring delay times, FIG. 5 shows an adder with eight 1-bit inputs in the form of a hierarchy of four half-adders H1 . . . H4, two following synchronous adders SA1 and SA2 and a terminating synchronous adder SA, whereby the three adder levels respectively effect two gate running times and, thus, a maximum of six gate running times are required for these adders.

Overall, a delay of 30 gate running times derives for the realization with M=7 input signals and respectively k=4 significance levels for the sorting logic shown in FIG. 3, whereas an initially indicated, obvious solution would require 105 gate running times. Given this example, a speed advantage of approximately a factor 3.5 derives. The advantage of the present invention over an initially indicated, simple means for determining a predetermined number of highest signals becomes all the clearer the greater the number of input signals M.

I claim as my invention:

1. An apparatus for a fast determination of a prescribable number of highest value input signals from a number of input signals each comprising an input word, said apparatus comprising:

a number of recoders, each one of said recoders having an input for receiving one of said input signals, said recoders recoding said input words into expanded input words having significant bits dependent on a value of said input words, and having an output for outputting said expanded input words; and a sorting logic having a first input for receiving a control signal identifying said prescribable number and a second input for receiving said expanded input words, said sorting logic forming and outputting a prescribable number of output words of highest value input signals from said expanded input words.

2. The apparatus according to claim 1, wherein said sorting logic further comprises:

an adder module for concurrently receiving bits of said expanded input words, being ordered according to their place value, from said recoders, and outputting sum signals at an output;

a comparator module connected to said output of said adder module for comparing said sum signals to said prescribable number, and having an output;

a switch module being driven by said comparator output connected to a first input of said switch module, said switch module having a second input for concurrently receiving said bits of said expanded input words, being ordered according to their place value, and an output for passing through said bits of said expanded input words selectively determined by said comparator output; and an encoder module having an input connected to said output of said switch module and for forming and outputting said prescribable number of output words of highest value input signals from said expanded input words being passed through from said switch module.

3. The apparatus according to claim 2, wherein said number of input signals further comprises M input signals;

wherein said expanded input words further comprise a word width k;

wherein said adder module further comprises M*k−1 adder modules, an i$^{th}$ adder module of said M*k−1 adder modules further compring i−1 inputs, wherein i being an integer defined 1<i<M*k−1;

wherein a most significant bit of a first expanded input word being directly inputted to said comparator module; and wherein said bits of said expanded input words, being ordered according to their place value, being sequentially received at said i$^{th}$ adders.

* * * * *